United States Patent Office 3,825,500
Patented July 23, 1974

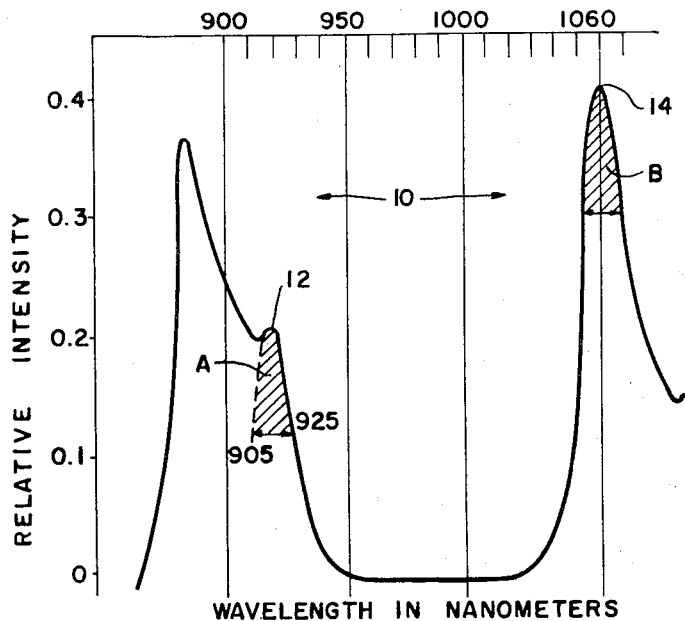
FIG. 1.
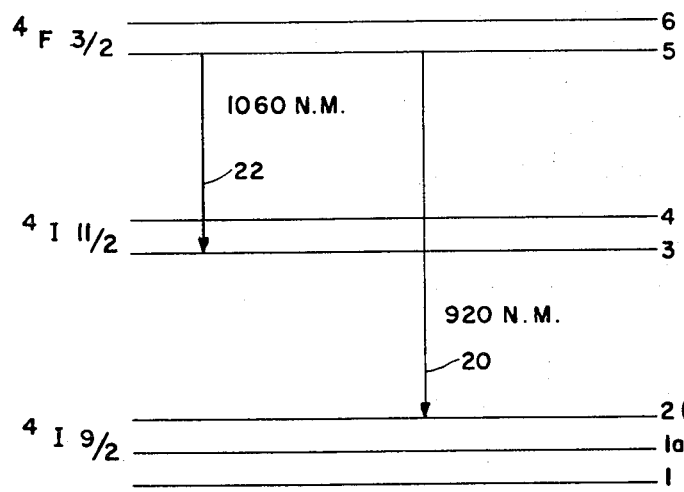
FIG. 2.
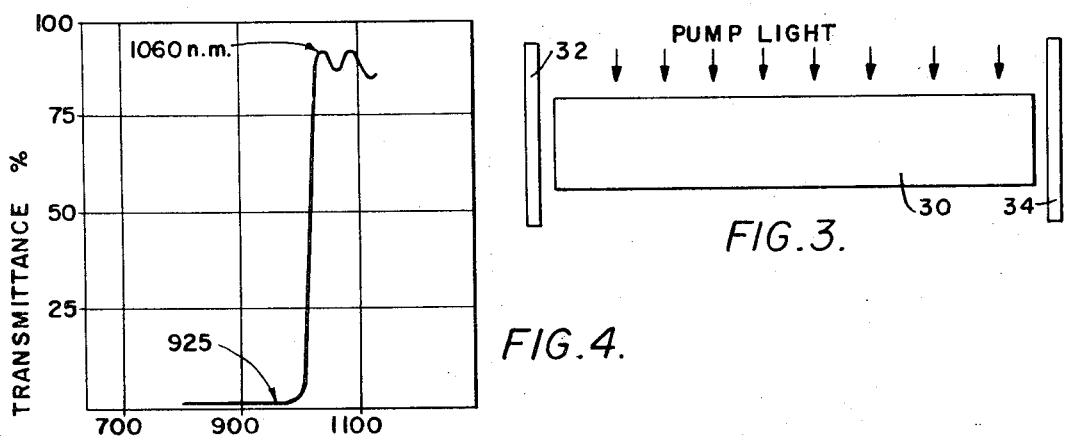
FIG. 3.
FIG. 4.

3,825,500
NEODYMIUM GLASS LASER HAVING ROOM TEMPERATURE OUTPUT AT WAVELENGTHS SHORTER THAN 1060 NM
Robert R. Shaw and Charles C. Robinson, Sturbridge, Mass., assignors to American Optical Corporation, Southbridge, Mass.
Original application Mar. 10, 1971, Ser. No. 122,723, now Patent No. 3,714,059. Divided and this application Aug. 31, 1972, Ser. No. 285,262
Int. Cl. C03c 3/12, 3/28; C09k 1/04
U.S. Cl. 252—301.4 F           4 Claims

ABSTRACT OF THE DISCLOSURE

Laserable material doped with a quantity of neodymium ions in a low concentration which results in the glass exhibiting a ratio of fluorescent intensity peaked at 920 nanometers over the fluorescent intensity peaked at approximately 1060 nanometers of at least .4 as measured by a Cary Model 14 spectrophotometer. The glasses enable the generation of laser light in a waveband with an optical center at about 920 nanometers at room temperature (approximately 20° C.) when positioned in a laser cavity which is resonant at 920 nanometers. Four such laserable glasses are given below in weight percent:

| | | | | |
|---|---|---|---|---|
| $Cs_2O$ | 68.9 | 69.1 | 52.4 | 61.6 |
| $Nd_2O_3$ | 2.0 | 3.0 | 2.0 | 3.0 |
| $TiO_2$ | 29.1 | | | |
| $B_2O_3$ | | 27.9 | | 35.4 |
| $GeO_2$ | | | 45.6 | |

This application is related to Application Ser. No. 122,724, filed Mar. 10, 1971, now U.S. Pat. 3,711,787, entitled "Neodymium Glass Laser Having Room Temperature Output at Wavelengths Shorter than 1060 Nm." by E. Snitzer, C. Robinson and R. Woodcock. The subject matter thereof is incorporated herein by reference.

Background of the Invention

This is a division of application Ser. No. 122,723, filed Mar. 10, 1971, now U.S. Pat. 3,714,059.

For many applications it is considered desirable to have a laser device capable of producing an output of laser light energy at wavelengths of 920 nanometers. The desirability of generating light at this wavelength is notable with systems utilizing detectors since there are detectors available which are extremely sensitive at this wavelength. Crystals exhibiting such emission are known. For example, a YAG crystal laser is described in an article entitled "Oscillation and Doubling of the 0.946-$\mu$ Line in $Nd^{3+}$:YAG" which appeared in *Applied Physics Letter*, Vol. 15, No. 4, 15 August 1969, page 111. A problem, however, with the YAG laser is that it is a crystal and thus does not possess the numerous advantages that are known to be attendant with glass lasers.

Glass has various characteristics which can make it an ideal laser host material. It can be made in large pieces of diffraction-limited optical quality, e.g., with an index refraction variation of less than one part per million across a 2.5-cm. diameter. In addition, glass lasers have been made in a variety of shapes and sizes from fibers a few microns wide supporting only a single dielectric waveguide mode, to rods 2 meters long or 7.5 cm. in diameter. Furthermore, pieces of glass with quite different optical properties can be fused to solve certain system design problems.

Glass composition can be tailored to give an index of refraction in the range of 1.5 to 2.0. Also, thermally stable laser cavities can be achieved by adjusting glass constituents to create an athermal laser glass.

There are two important differences between glass and crystal lasers. First, the thermal conductivity of glass is considerably lower than that of most crystal hosts. The second important difference between glass and crystal lasers is the inherently broader absorption and emission lines of ions in glass. These broader lines imply greater pump-light absorption, greater energy storage and much reduced spontaneous self-depletion for a given energy storage.

A glass laser has been suggested which exhibits an output at about 9180 A. from neodymium active ions. Such a laser device is described in U.S. Pat. No. 3,270,290 by R. D. Maurer. However, in the Maurer patent the device is not taught to be capable of laser emission at room temperature. In connection with room temperature operation, it is well known that it is desirable to utilize a laser at room temperature in order to eliminate cumbersome equipment otherwise necessary to cool the laser device.

Summary of the Invention

In accordance with the present invention a neodymium doped laser glass is provided which enables generation of laser radiation at about 920 nanometers at room temperature.

Accordingly, it is an object of the present invention to provide new neodymium doped laser glass devices which are capable of operating at room temperature and which will generate laser light energy in waveband with an optical center at about 920 nanometers.

Brief Description of the Drawing

FIG. 1 is an emission curve showing the fluorescent emission properties of glasses utilized in laser devices of the present invention;

FIG. 2 is a schematic representation of the various energy levels in a $Nd^{3+}$ ion;

FIG. 3 is a diagrammatic illustration of a laser device of the present invention;

FIG. 4 is a transmittance and reflectance curve of a reflector useful in the laser device of the present invention.

Description of the Preferred Embodiments

In accordance with the present invention, a laser device is provided which is comprised of a neodymium doped glass laser host positioned within an optically regenerative laser cavity. It has been found that trivalent neodymium ions in glass hosts typically have emission curves of the general shape shown in FIG. 1. This curve is provided at the outset to illustrate properties which are useful in carrying out the object of the present invention.

The fluorescent curves shown were measured in a Cary 14 spectrophotometer by placing the glass sample in a copper fixture which in turn was placed in the sample compartment of the Cary. The glass was irradiated at right angles with a Xenon arc lamp through a filter which blocked the transmission of wavelengths longer than approximately 800 nm. The fluorescent spectrum was recorded using the automatic slit control which adjusted the slit width so that the output of a coiled tungsten filament lamp with a filament temperature of approximately 2800° K. produced a constant deflection on the recording chart for all wavelengths. Thus the recording chart must be corrected to obtain the true relative intensities by dividing the chart deflection by a factor proportional to the energy radiated by the tungsten lamp at the wavelengths of interest. We have estimated the correction factor for obtaining the ratio of the 920 nm. fluorescent intensity to the 1060 nm. intensity to be approximately unity. This estimate was made by using the tungsten emissivities measured by J. C. DeVos (J. C. DeVos, Physics 20,690 (1954) for a ribbon filament tungsten lamp operating at 2800° K. in a calculation of the energy radiated by the coiled filament lamp at the two wavelengths of interest. The intensity ratios reported here were measured directly from the Cary charts using no correction factor.

In FIG. 1 a curve 10 is shown with peaks 12 and 14 at 920 nanometers and 1060 nanometers respectively. In connection with these and similar peaks, it is to be understood that the actual range of useful fluorescent emission is somewhat broad. In fact, in accordance with the invention peak 12 can have a band width of 20 nanometers located between 905–925 nanometers, as is represented by spectral region A of FIG. 1, while peak 14 can have a width of 20 nanometers located between 1050–1070 nanometers, as is represented by spectral region B of curve 10. Although curve 10 shows other peaks, for purposes of the present invention the entire peaks represented by spectral regions A and B of curve 10 are the most critical. Numerous tests have indicated that when a neodymium doped glass host is positioned in a cavity with reflectors that suppress emission at 1060 nanometers, peaks A and B are the only peaks that need be considered in evaluating whether the laser will emit at 1060 nm. or 920 nm. at room temperature. Although a ratio of $A/B$ of at least .4 produces operative results, that is, laser action at 920 nanometers at room temperature (20° C.), it is to be understood that in accordance with the invention the greater the magnitude of the foregoing ratio the more effective will be the host for producing the desired laser emission when positioned in the cavity of the present invention.

As indicated above, in addition to considering the emission spectra of the host glass, consideration must also be given to the optically regenerative laser cavity into which the host glass is positioned. In accordance with the invention the reflectors forming the laser cavity must suppress laser emission at 1060 nanometers. It is to be understood that such reflectors are available and that the reflectors per se form no part of the present invention. For example, dichroic reflectors are available which transmit approximately 85% of the light at 1060 nanometers while reflecting approximately 99.7% of the light between the range of 800–1000 nanometers.

Although not intended to be restricted to a particular theory, an understanding of the energy level scheme including the $4_{I9/2}$ manifold of the $Nd^{3+}$ ion is useful in explaining the present invention. In this regard, FIG. 2 is provided as a schematic representation of the various energy levels in a $Nd^{3+}$ ion.

A condition necessary for laser action according to this invention is that the population of the initial state be at least as large as the terminal state which requires, therefore, that the initial state population be at least 0.033 of the total population in the ground manifold ($4_{I9/2}$).

The cavity losses for the 1060 nanometers emission must be higher than those for the 920 nanometers emission including the effect of the population in level 2.

In accordance with the invention, a laser device was constructed and tested. The host glass had the composition in percent by weight as set forth in Example 16 below. From the laser glass of Example 16, a rod 3 inches in length was fabricated utilizing known techniques. The rod 30 was positioned in an optically regenerative laser cavity formed by reflectors 32 and 34, as is shown in FIG. 3. To demonstrate the laser device of the present invention, two extreme experiments were conducted. In the first experiment a reflector $R_1$ (32 of FIG. 3) which was 98% reflective for light at 920 nanometers and 98.4% reflective at 1060 nanometers, was employed as one reflector with a second reflector $R_2$ (34 of FIG. 3), which was 99.5% reflective at 920 nanometers and 15% reflective at 1060 nanometers. With the combination of reflectors $R_1$ and $R_2$, laser action at 920 nanometers was observed with the host glass of Example 16. In a second test with both reflectors 32 and 34 being $R_2$ types, laser emission at 920 nanometers occurred even more readily.

The foregoing tests, as well as other tests, proved that when the ratio of $A/B$ discussed above is greater than .4, the laser device will generate laser light energy at about 920 nanometers at room temperature (20° C.) if the device includes reflectors compatible with that wavelength and which suppress laser emission at 1060 nanometers. A pump light source is not shown in FIG. 3, it being understood that many pump sources are available which will produce the required population inversion in the neodymium ion. One such pump source commonly employed is a xenon flash tube. In this regard, the hardware for producing energy inversions are conventional and form no part of the present invention.

The transmittance and reflectance curve of the $R_2$ type reflectors is shown in FIG. 4 of the drawing. Such a reflector is available from Spectra-Physics, 1250 West Middlefield Road, Mountain View, Calif. 94040.

The laser glass as set forth in Example 16, as well as the other examples, are preferably formed in the following manner. The alkali earth and alkaline earth metals are added to the batch as nitrates or carbonates and all other constituents of the finished glass (silica, neodymium, zinc, boron, antimony) are added directly as oxides. The constituents are added in the known stoichiometric amounts to yield a glass having a final composition as set forth in the various examples. The glass making raw materials must be of high purity and, in particular, must be free of contamination from iron or other elements which would cause light absorption at the desired laser emission wavelength if they were present in the finished glass. The finished glass, for example, should not contain more than 5 parts per million of iron as $Fe_2O_3$. The glass may be prepared by fusing the raw materials in a ceramic crucible heated in a "Globar" electric furnace. No special atmosphere is necessary in the furnace. The raw materials are mixed intimately and as completely as possible in a mixing device that does not introduce any contamination. The mixed batch is loaded into a high purity ceramic crucible which will not contaminate the melt with undesirable impurities. The crucible should be at a temperature of approximately 2700° F. when the raw material is charged, the loading operation taking approximately two hours since the level in the crucible drops as the batch materials fuse together to form the glass and thus require the addition of more batch. When the charging of the batch is completed, the temperature of the melt is raised to approximately 2800° F. and is held at this temperature for one hour to free the melt of striae. The temperature of the glass is then lowered to approximately 2700° F. where it is maintained for a period of about one hour before casting. The temperature value last recited is suitable for a melt of 1 lb. but it is to be understood that the preferred temperature at casting is a function of the size of the cast with larger casts requiring lower temperatures for control of the glass. The glass may be cast in a cast iron mold, and is transferred to an annealing oven just as soon as it has cooled enough to maintain its shape. The glass is annealed at a temperature of 1100° F. for one hour and is then cooled down slowly overnight to room temperature.

In the following examples:

Column 1 = components in finished glass
Column 2 = percent by weight of components in the finished glass
Column 3 = $\dfrac{\text{fluorescence intensity peaked between 905 nanometers to 925 nanometers}}{\text{fluorescence intensity peaked between 1050 nanometers to 1070 nanometers}}$ (referred to in the specification as A/B)
Column 4 = figure of the drawing showing relative fluorescence intensity curve

EXAMPLE 1

| 1 | 2 | 3 | 4 |
|---|---|---|---|
| $SiO_2$ | 51.3 | .545 | Fig. 1 |
| $Cs_2O$ | 31.2 | | |
| $ZnO$ | .7 | | |
| $CaO$ | 1.4 | | |
| $BaO$ | 11.1 | | |
| $B_2O_3$ | 2.2 | | |
| $Sb_2O_3$ | .6 | | |
| $Nd_2O_3$ | 1.5 | | |

EXAMPLE 2

| 1 | 2 | 3 |
|---|---|---|
| $CaO$ | 46.8 | .615 |
| $Al_2O_3$ | 39.8 | |
| $MgO$ | 4.8 | |
| $SiO_2$ | 4.8 | |
| $Nd_2O_3$ | 3.8 | |

EXAMPLE 3

| 1 | 2 | 3 |
|---|---|---|
| $CaO$ | 43.6 | .66 |
| $Al_2O_3$ | 37.0 | |
| $MgO$ | 4.5 | |
| $BaO$ | 11.4 | |
| $Nd_2O_3$ | 3.5 | |

EXAMPLE 4

| 1 | 2 | 3 |
|---|---|---|
| $CaO$ | 49.0 | .532 |
| $Al_2O_3$ | 43.1 | |
| $SiO_2$ | 5.9 | |
| $Nd_2O_3$ | 2.0 | |

EXAMPLE 5

| 1 | 2 | 3 |
|---|---|---|
| $CaO$ | 43.9 | .586 |
| $Al_2O_3$ | 47.6 | |
| $SiO_2$ | 6.5 | |
| $Nd_2O_3$ | 2.0 | |

EXAMPLE 6

| 1 | 2 | 3 |
|---|---|---|
| $CaO$ | 42.1 | .672 |
| $Al_2O_3$ | 46.1 | |
| $BaO$ | 9.8 | |
| $Nd_2O_3$ | 2.0 | |

EXAMPLE 7

| 1 | 2 | 3 |
|---|---|---|
| $CaO$ | 41.1 | .545 |
| $Al_2O_3$ | 40.4 | |
| $BaO$ | 16.5 | |
| $Nd_2O_3$ | 2.0 | |

EXAMPLE 8

| 1 | 2 | 3 |
|---|---|---|
| $CaO$ | 41.1 | .634 |
| $Al_2O_3$ | 49.0 | |
| $SrO$ | 7.9 | |
| $Nd_2O_3$ | 2.0 | |

EXAMPLE 9

| 1 | 2 | 3 |
|---|---|---|
| $Na_2O$ | 4.15 | .555 |
| $K_2O$ | 2.10 | |
| $CaO$ | 32.80 | |
| $Al_2O_3$ | 43.50 | |
| $MgO$ | 1.45 | |
| $BaO$ | 5.50 | |
| $La_2O_3$ | 5.85 | |
| $SiO_2$ | 2.65 | |
| $Nd_2O_3$ | 2.00 | |

EXAMPLE 10

| 1 | 2 | 3 |
|---|---|---|
| $BaO$ | 26.6 | .42 |
| $Al_2O_3$ | 8.8 | |
| $GeO_2$ | 63.6 | |
| $Nd_2O_3$ | 1.0 | |

EXAMPLE 11

| 1 | 2 | 3 |
|---|---|---|
| $BaO$ | 59.0 | .45 |
| $Al_2O_3$ | 7.8 | |
| $GeO_2$ | 32.2 | |
| $Nd_2O_3$ | 1.0 | |

EXAMPLE 12

| 1 | 2 | 3 |
|---|---|---|
| $Cs_2O$ | 68.9 | .68 |
| $TiO_2$ | 29.1 | |
| $Nd_2O_3$ | 2.0 | |

EXAMPLE 13

| 1 | 2 | 3 |
|---|---|---|
| $Cs_2O$ | 69.1 | .408 |
| $B_2O_3$ | 27.9 | |
| $Nd_2O_3$ | 3.0 | |

EXAMPLE 14

| 1 | 2 | 3 |
|---|---|---|
| $Cs_2O$ | 52.4 | .505 |
| $GeO_2$ | 45.6 | |
| $Nd_2O_3$ | 2.0 | |

EXAMPLE 15

| 1 | 2 | 3 |
|---|---|---|
| $Cs_2O$ | 21.6 | .412 |
| $B_2O_3$ | 35.4 | |
| $Nd_2O_3$ | 3.0 | |

EXAMPLE 16

| 1 | 2 | 3 |
|---|---|---|
| $SiO_2$ | 36.57 | .47 |
| $Cs_2O$ | 46.58 | |
| $ZnO$ | .71 | |
| $CaO$ | 1.42 | |
| $BaO$ | 11.23 | |
| $B_2O_3$ | 2.22 | |
| $Sb_2O_3$ | .61 | |
| $Nd_2O_3$ | .66 | |

In accordance with the invention it has been discovered that the neodymium ion concentration is the most important factor to consider in order to obtain a laser glass with an $A/B$ ratio greater than .4. From the foregoing examples and numerous tests, .1–3 wt. percent of $Nd_2O_3$ in the final glass results in a laser glass which is usable in accordance with the invention. The best results, however, result from a glass containing .5–1.5 wt. percent $Nd_2O_3$.

In accordance with the invention, operative results occur when the neodymium ion concentration is kept low, as is the case with the foregoing examples. It has also been discovered that with Nd-silicate glass lasers, heavy monovalent alkali ions, that is, potassium, rubidium and cesium, when included in the glass to replace lighter alkali ions, that is, sodium and lithium, improve the overall results. That is, the ratios of fluorescent intensity peaked at 920 nanometers over the fluorescent intensity peaked at 1060 nanometers ($A/B$) greatly in excess of .4 are possible. Thus, $A/B$ ratios of silicate glasses containing neodymium in the range of .1 to 3 wt. percent as laser active ingredient are substantially increased by the use of these heavier alkali monovalent ions.

With respect to the divalent ions, it has been discovered that an increase in their concentration tends to lower the $A/B$ ratio. It is to be emphasized, however, that as long as the neodymium concentration is kept below 3 wt. percent, usable results will occur with any of the known prior art Nd doped laser glasses. However, heavier divalent ions such as lead, cadmium and strontium have been found to lower the foregoing ratio to a lesser extent when compared to the effect caused by light divalent ion such as calcium. Barium has been especially desirable in increasing the foregoing ratio in silicate glasses with trivalent neodymium within the range of .1–3 wt. percent.

In this regard, usable glasses may include barium oxide in the range of 0–10 wt. percent with approximately 5 wt. percent being preferred. A range of 0–10 wt. percent is suitable for other divalent ions usable in the glass composition.

Tests show that in silicate glass compositions containing more than approximately 10 weight percent of alkali, a given molar percentage of $Cs_2O$ is superior than the same molar percentage of $Rb_2O$ which in turn is better than the same molar percentage of $K_2O$ insofar as an increase of $A/B$ is concerned. From the standpoint of maximizing the $A/B$ ratio of a laser component, it would be desirable to have all of the alkali provided by use of cesium or rubidium in relatively large weight percentages of the order of 20%.

Composition ranges for Nd-silicate base glasses which promote high $A/B$ ratios are given in the tables below:

TABLE 1

| Constituent | | Range in percent by wt. in finished glass |
|---|---|---|
| Divalent ion | Lead oxide | 0–10 |
| Monovalent ion | Potassium oxide | 7–20 |
| Laser ion | $Nd_2O_3$ | .1–3 |
| Base | Silicate | Balance |

TABLE 2

| Constituent | | Range in percent by wt. in finished glass |
|---|---|---|
| Divalent ion | Lead oxide | 0–10 |
| Monovalent ion | Rubidium oxide | 7–20 |
| Laser ion | $Nd_2O_3$ | .1–3 |
| Base | Silicate | Balance |

TABLE 3

| Constituent | | Range in percent by wt. in finished glass |
|---|---|---|
| Divalent ion | Lead oxide | 0–10 |
| Monovalent ion | Cesium oxide | 7–20 |
| Laser ion | $Nd_2O_3$ | .1–3 |
| Base | Silicate | Balance |

TABLE 4

| Constituent | | Range in percent by wt. in finished glass |
|---|---|---|
| Divalent ion | Cadmium oxide | 0–10 |
| Monovalent ion | Potassium oxide | 7–20 |
| Laser ion | $Nd_2O_3$ | .1–3 |
| Base | Silicate | Balance |

TABLE 5

| Constituent | | Range in percent by wt. in finished glass |
|---|---|---|
| Divalent ion | Cadmium oxide | 0–10 |
| Monovalent ion | Rubidium oxide | 7–20 |
| Laser ion | $Nd_2O_3$ | .1–3 |
| Base | Silicate | Balance |

TABLE 6

| Constituent | | Range in percent by wt. in finished glass |
|---|---|---|
| Divalent ion | Cadmium oxide | 0–10 |
| Monovalent ion | Cesium oxide | 7–20 |
| Laser ion | $Nd_2O_3$ | .1–3 |
| Base | Silicate | Balance |

TABLE 7

| Constituent | | Range in percent by wt. in finished glass |
|---|---|---|
| Divalent ion | Barium oxide | 0–10 |
| Monovalent ion | Potassium oxide | 7–20 |
| Laser ion | $Nd_2O_3$ | .1–3 |
| Base | Silicate | Balance |

TABLE 8

| Constituent | | Range in percent by wt. in finished glass |
|---|---|---|
| Divalent ion | Barium oxide | 0–10 |
| Monovalent ion | Rubidium oxide | 7–20 |
| Laser ion | $Nd_2O_3$ | .1–3 |
| Base | Silicate | Balance |

TABLE 9

| Constituent | | Range in percent by wt. in finished glass |
|---|---|---|
| Divalent ion | Barium oxide | 0–10 |
| Monovalent ion | Cesium oxide | 7–20 |
| Laser ion | $Nd_2O_3$ | .1–3 |
| Base | Silicate | Balance |

TABLE 10

| Constituent | | Range in percent by wt. in finished glass |
|---|---|---|
| Divalent ion | Strontium oxide | 0–10 |
| Monovalent ion | Potassium oxide | 7–20 |
| Laser ion | $Nd_2O_3$ | .1–3 |
| Base | Silicate | Balance |

TABLE 11

| Constituent | | Range in percent by wt. in finished glass |
|---|---|---|
| Divalent ion | Strontium oxide | 0–10 |
| Monovalent ion | Rubidium oxide | 7–20 |
| Laser ion | $Nd_2O_3$ | .1–3 |
| Base | Silicate | Balance |

TABLE 12

| Constituent | | Range in percent by wt. in finished glass |
|---|---|---|
| Divalent ion | Strontium oxide | 0–10 |
| Monovalent ion | Cesium oxide | 7–20 |
| Laser ion | $Nd_2O_3$ | .1–3 |
| Base | Silicate | Balance |

TABLE 13

| Constituent | | Range in percent by wt. in finished glass |
|---|---|---|
| Divalent ion | Lead oxide | 0–10 |
| Monovalent ion | Mixture of two or more of potassium, cesium and rubidium. | 7–20 |
| Laser ion | $Nd_2O_3$ | .1–3 |
| Base | Silicate | Balance |

TABLE 14

| Constituent | | Range in percent by wt. in finished glass |
|---|---|---|
| Divalent ion | Cadmium oxide | 0–10 |
| Monovalent ion | Mixture of two or more of potassium, cesium and rubidium. | 7–20 |
| Laser ion | $Nd_2O_3$ | .1–3 |
| Base | Silicate | Balance |

TABLE 15

| Constituent | | Range in percent by wt. in finished glass |
|---|---|---|
| Divalent ion | Barium oxide | 0–10 |
| Monovalent ion | Mixture of two or more of potassium, cesium and rubidium. | 7–20 |
| Laser ion | $Nd_2O_3$ | .1–3 |
| Base | Silicate | Balance |

TABLE 16

| Constituent | | Range in percent by wt. in finished glass |
|---|---|---|
| Divalent ion | Strontium oxide | 0–10 |
| Monovalent ion | Mixture of two or more of potassium, cesium and rubidium. | 7–20 |
| Laser ion | $Nd_2O_3$ | .1–3 |
| Base | Silicate | Balance |

It should be understood that the term "silicate" base as used throughout this specification and claims is generic to pure silica, SiO₂, and other known silicate bases, such as alumino-silicate bases. In this regard, various base modifiers are fining agents are contemplated to be included in the silicate bases of the foregoing examples.

From six different glass compositions chosen from the foregoing tables, laser rods 2½" long x 4 mm. diameter were fabricated. For this range of concentrations the threshold for laser action varied from 100 to 137 joules input respectively.

Verification that these rods were lasing at 0.92 μm. and not 1.06 μm. was made using an infrared image converter and appropriate narrow band pass filters for the wavelengths in question.

When the laser rod is to be utilized in a laser system where solarization is a problem, the rod containing the low concentration of Nd₂O₃ may be appropriately clad to prevent the solarization of the laser rod. It is to be understood, however, that a clad rod is not part of the present invention.

The invention may be embodied in other specific forms wtihout departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An inorganic laser glass exhibiting a ratio of fluorescent intensity peaked at approximately 920 nanometers over fluorescent intensity peaked at approximately 1060 nanometers of at least 0.4, the glass consisting essentially of the following constituents in percent by weight:

| | |
|---|---|
| Cs₂O | 68.9 |
| Nd₂O | 2.0 |
| TiO₂ | 29.1 |

2. An inorganic laser glass exhibiting a ratio of fluorescent intensity peaked at approximately 920 nanometers over fluorescent intensity peaked at approximately 1060 nanometers of at least 0.4, the glass consisting essentially of the following constituents in percent by weight:

| | |
|---|---|
| Cs₂O | 69.1 |
| Nd₂O₃ | 3.0 |
| B₂O₃ | 27.9 |

3. An inorganic laser glass exhibiting a ratio of fluorescent intensity peaked at approximately 920 nanometers over fluorescent intensity peaked at approximately 1060 nanometers of at least 0.4, the glass consisting essentially of the following constituents in percent by weight:

| | |
|---|---|
| Cs₂O | 61.6 |
| Nd₂O₃ | 3.0 |
| B₂O₃ | 35.4 |

4. An inorganic laser glass exhibiting a ratio of fluorescent intensity peaked at approximately 920 nanometers over fluorescent intensity peaked at approximately 1060 nanometers of at least 0.4, the glass consisting essentially of the following constituents in percent by weight:

| | |
|---|---|
| Cs₂O | 52.4 |
| Nd₂O₃ | 2.0 |
| GeO₂ | 45.6 |

References Cited

UNITED STATES PATENTS

| | | | |
|---|---|---|---|
| 3,270,290 | 8/1966 | Maurer | 252—301.4 F |
| 3,674,455 | 7/1972 | Dugger | 106—47 Q |
| 3,624,547 | 11/1971 | Dugger | 252—301.4 F |
| 3,422,025 | 1/1969 | Snitzer et al. | 252—301.6 F |

OTHER REFERENCES

Rawson, H., *Inorganic Glass-Forming Systems* (1964), pp. 112–3, 184, 202.

HELEN M. McCARTHY, Primary Examiner

U.S. Cl. X.R.

106—47 Q; 252—301.4 R; 331—94.5 E